(12) United States Patent
Toya

(10) Patent No.: US 7,373,081 B2
(45) Date of Patent: May 13, 2008

(54) STROBOSCOPIC FLASH DEVICE FOR A DIGITAL CAMERA

(75) Inventor: Toshio Toya, Taitou-ku (JP)

(73) Assignee: Sonictechno Co., Ltd., Tokyo (JP)

( * ) Notice: Subject to any disclaimer, the term of this patent is extended or adjusted under 35 U.S.C. 154(b) by 534 days.

(21) Appl. No.: 11/138,625

(22) Filed: May 26, 2005

(65) Prior Publication Data

US 2005/0265708 A1    Dec. 1, 2005

(30) Foreign Application Priority Data

Jun. 1, 2004  (JP)  .............................. 2004-163138

(51) Int. Cl.
*G03B 15/05* (2006.01)
(52) U.S. Cl. ........................................ 396/16; 396/199
(58) Field of Classification Search ................ 396/14, 396/16, 62, 175, 199; 362/11, 17, 18; 348/66, 348/77, 370, 371; D16/329, 240
See application file for complete search history.

(56) References Cited

U.S. PATENT DOCUMENTS 4,392,183 A * 7/1983 Ostlund et al. ............... 362/11

FOREIGN PATENT DOCUMENTS

| JP | U-57-182728 | 11/1982 |
|----|-------------|---------|
| JP | 2002-122936 A | 4/2002 |

* cited by examiner

*Primary Examiner*—W. B. Perkey
(74) *Attorney, Agent, or Firm*—Pearne & Gordon LLP

(57) ABSTRACT

A stroboscopic flash device for a digital camera having a plurality of stroboscopic flash units mounted on a ring-like holder provided removably attached to a lens barrel of the digital camera comprising a circumferential position adjustment mechanism to adjust a circumferential position of the two stroboscopic flash units along the ring-like holder, an upward and leftward position adjustment mechanism to adjust an upward and downward position of a flash face of the stroboscopic flash units and a rightward and leftward position adjustment mechanism to adjust a rightward and leftward position of the flash face of the stroboscopic flash units, the circumferential position adjustment, the upward and downward position adjustment mechanism and the rightward and leftward position adjustment mechanism being adapted to indicate the optimum stroboscopic flash positions relative to every photographic part of the photographic object by distinguishing them by a pointer corresponding to any of colored indication parts and to detect the optimum stroboscopic flash positions by click stop means.

7 Claims, 6 Drawing Sheets

(A)

(B)

(C)

STROBOSCOPIC FLASH DEVICE FOR A DIGITAL CAMERA

TECHNICAL FIELD OF THE INVENTION

This invention relates to a stroboscopic flash device comprising at least two stroboscopic flash units attached to a front end of a lens barrel of a digital camera and more particularly to a stroboscopic flash device adapted to be able to set the optimum direction (posture) of the stroboscopic flash units relative to every photographic part of an object.

BACKGROUND OF THE INVENTION

Lately, a patient's whole body, its upper half of the body, its face and its whole mouth or its part are taken a photograph of by using a digital camera for the purpose of dentistry medical treatment. In this manner, when the photographic object having various sizes over a wide range from a small part of the object to a whole thereof should be taken the photograph of, it is required to uniformly irradiate a light to every part of the photographic object by adjusting the position of the stroboscopic flash units relative to every photographic part of the object.

In order to take a stroboscopic flash photograph of the object for such a purpose, the stroboscopic flash units may be desirably disposed at least on both sides of the lens barrel of the digital camera so as to uniformly irradiate the light to the photographic object.

There has been known by JU 57-182728A a stroboscopic flash device adapted to be able to adjust the position thereof so as to irradiate the light from the stroboscopic flash units from various angles.

This prior stroboscopic flash device comprises a ring-like holder attached to a front end of the lens barrel of the camera and stroboscopic flash holding bases holding the stroboscopic flash units, respectively and slipperily supported on the ring-like holder. When a pair of knobs of the stroboscopic flash unit holding bases are forced so as to be moved in a direction where they approach each other, the bases can be released relative to the ring-like holder whereby the position of the stroboscopic flash units can be adjusted in a circumferential direction.

However, since this prior stroboscopic flash device can adjust only the circumferential position of the stroboscopic flash units, it could not be applied to the photography of the object having varying in the size of the photographic parts such as the patient's whole body or its part of the mouth in the dentistry clinical photography. Especially, the digital camera has a dynamic range (latitude) narrower than a silver salt film camera and therefore the digital camera is required to irradiate the light onto the photographic object at a precise angle and with a stable optical quantity. Thus it will be understood that the conventional stroboscopic flash unit position adjustment used in the stroboscopic flash device for the silver salt film camera could not be used for the digital camera as it is.

Moreover, since the photographer sets the posture of the stroboscopic flash units depending on self experiential intuition, considerable skill was required for obtaining the optimal stroboscopic flash setup position for every photographic part of the object. Furthermore, a delicate position deflection tends to occur in the position setup for every setup even if it is an expert and therefore, a fixed posture was not always able to be imparted to the stroboscopic flash units, some deviation might possibly arise in the picture photography.

SUMMARY OF THE INVENTION

Accordingly, it is a principal object of the invention to provide a stroboscopic flash device for a digital camera adapted to more easily set the optimum posture of stroboscopic flash units relative to every photographic part of an object.

It is another object of the invention to provide a stroboscopic flash device for a digital camera adapted to set the optimum posture of stroboscopic flash units relative to every photographic part of an object without any high skill.

In accordance with a feature of the invention, there is provided a stroboscopic flash device for a digital camera including a ring-like holder removably attached to a lens barrel of a camera body of the digital camera and a plurality of stroboscopic flash unit holding bases to hold a plurality of stroboscopic flash units, respectively and comprising a circumferential position adjustment mechanism to adjust a circumferential position of the stroboscopic flash unit holding bases in a circumferential direction of the ring-like holder along the ring-like holder, characterized by further comprising an upward and downward position adjustment mechanism to adjust an upward and downward position of a flash face of the stroboscopic flash units by swinging the stroboscopic flash units about an axis perpendicular to the base surface of the stroboscopic flash unit holding bases and a rightward and leftward position mechanism to adjust a rightward and leftward position of the flash face of the stroboscopic flash units by swinging the stroboscopic flash units about an axis parallel to the base surface of the stroboscopic flash unit holding bases.

In the stroboscopic flash device of the invention, the circumferential position adjustment mechanism, the upward and downward position adjustment mechanism and the rightward and leftward position adjustment mechanism may preferably include click stop means to resiliently fix the optimum stroboscopic setup position relative to a photographic part of an object to be photographed.

This click stop means may typically comprises a plunger attached to one of two members relatively moved to each other and having a ball resiliently protruding therefrom and engagement holes provided in the other member and with which the ball of the plunger is to be engaged.

In the stroboscopic flash device of the invention, the circumferential position adjustment mechanism, the upward and downward position adjustment mechanism and the rightward and leftward position adjustment mechanism may preferably include position indication means to indicate the optimum stroboscopic flash setup position of the respective position adjustment mechanism relative to every photographic part of the object.

This position indication means may comprise a pointer provided a movable part of the respective mechanism and indication parts provided at a fixed part of the respective mechanism to correspond to the pointer at the optimum position of the stroboscopic flash units relative to every photographic part of the object. The position indication means may indicate the corresponding position by color distinction.

In this manner, since the stroboscopic flash device of the invention is adapted to adjust the position of the stroboscopic flash units in a circumferential direction, an upward or downward direction and a rightward or leftward direction, the optimum positions of the stroboscopic flash units can be set in the circumferential direction, the upward or downward direction and the rightward or leftward direction for every photographic part of the object whereby the predetermined posture of the stroboscopic flash units can be obtained.

Especially, with the optimum stroboscopic flash position previously known for the respective position adjustment mechanisms indicated, the circumferential, upward or downward and rightward or leftward optimum positions of the stroboscopic flash units are set in accordance with the indication for every photographic part of the object whereby the optimum posture of the stroboscopic flash units can be easily obtained.

With the optimum stroboscopic flash unit setup positions relative to the photographic part of the object resiliently fixed by the click stop means, since the optimum setup positions of the stroboscopic flash units can be promptly detected, the operation of photographic picture for the dentistry medical treatment can be more effectively accomplished.

The optimum positions of the stroboscopic flash units can be positively set by selecting the indication parts provided on the fixed parts of the respective position adjustment mechanisms in correspondence with the pointer provided on the movable parts of the respective position adjustment mechanisms and therefore the optimum position (posture) of the stroboscopic flash units can be easily confirmed.

BRIEF DESCRIPTION OF THE DRAWINGS

The above and other objects and features of the invention will be apparent from the detailed description of the preferred embodiment of the invention, which is described and illustrated with reference to the accompanying drawings, in which.

DETAILED DESCRIPTION OF PREFERRED EMBODIMENTS

Figure 1:
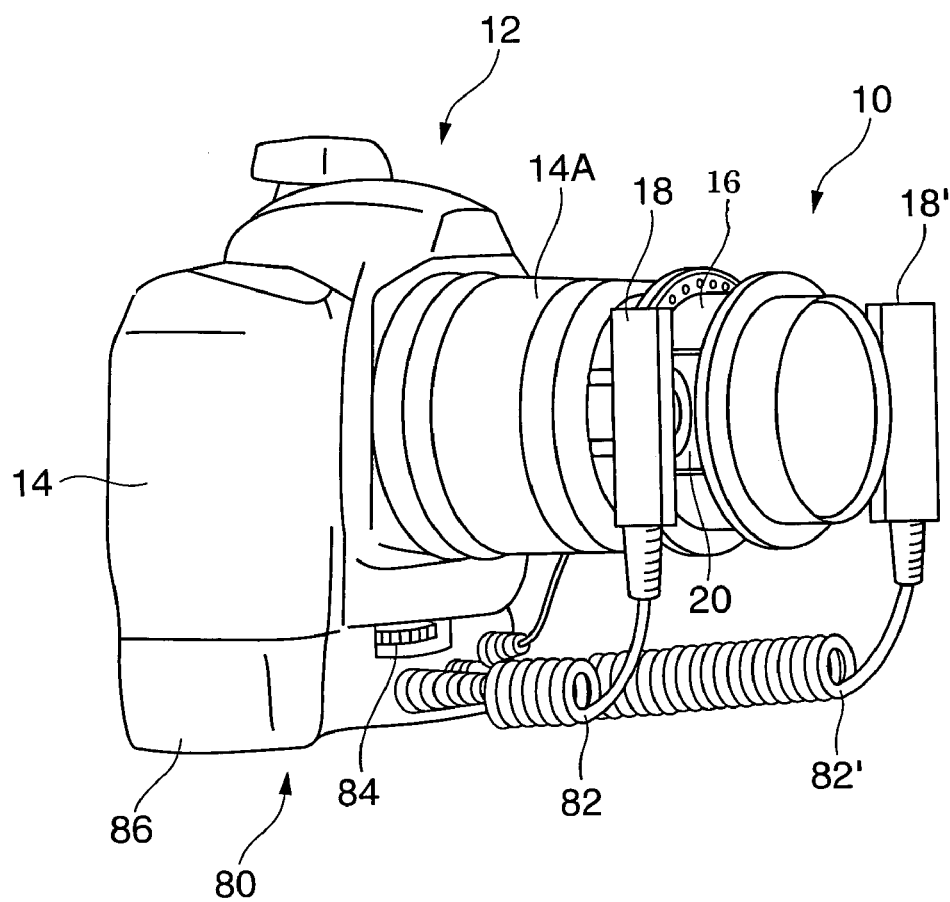
FIG. 1 is a perspective view of a digital camera having a stroboscopic flash device according to one embodiment form of the invention.

The invention will now be described with reference to accompanying drawings. FIG. 1 illustrates a digital camera 12 having a stroboscopic flash device 10 constructed in accordance with one embodiment form of the invention. The digital camera 12 comprises a camera body 14 including a plurality of lens barrels provided at a front thereof and having a zoom function.

The stroboscopic flash device 10 comprises a ring-like holder 16 removably attached to the lens barrel 14A of the camera body 14 and a plurality of (in the illustrated embodiment, two) stroboscopic flash unit holding bases 20 and 20' to hold a plurality of (in the illustrated embodiment, two) stroboscopic flash units 18 and 18', respectively through various position adjustment mechanisms described later.

The stroboscopic flash units 18 and 18' are connected by cables 82 and 82' to a mount type multistage stroboscopic flash regulator 80 on which the camera body 14 is securely mounted. In FIG. 1, a reference numeral 84 designates a screw rotating knob for securing the camera body 14 to a case 86 of the regulator 80 in a threaded engagement manner.

The ring-like holder 16 may be removably attached to a front end of the lens barrel 14A by conventional means. The typical attachment means may have the same construction as that for a ring-like stroboscopic flash holder as disclosed in JP 2002-122936A. The detailed construction of the attachment means will be omitted because it is not a gist of the invention.

Figure 2:
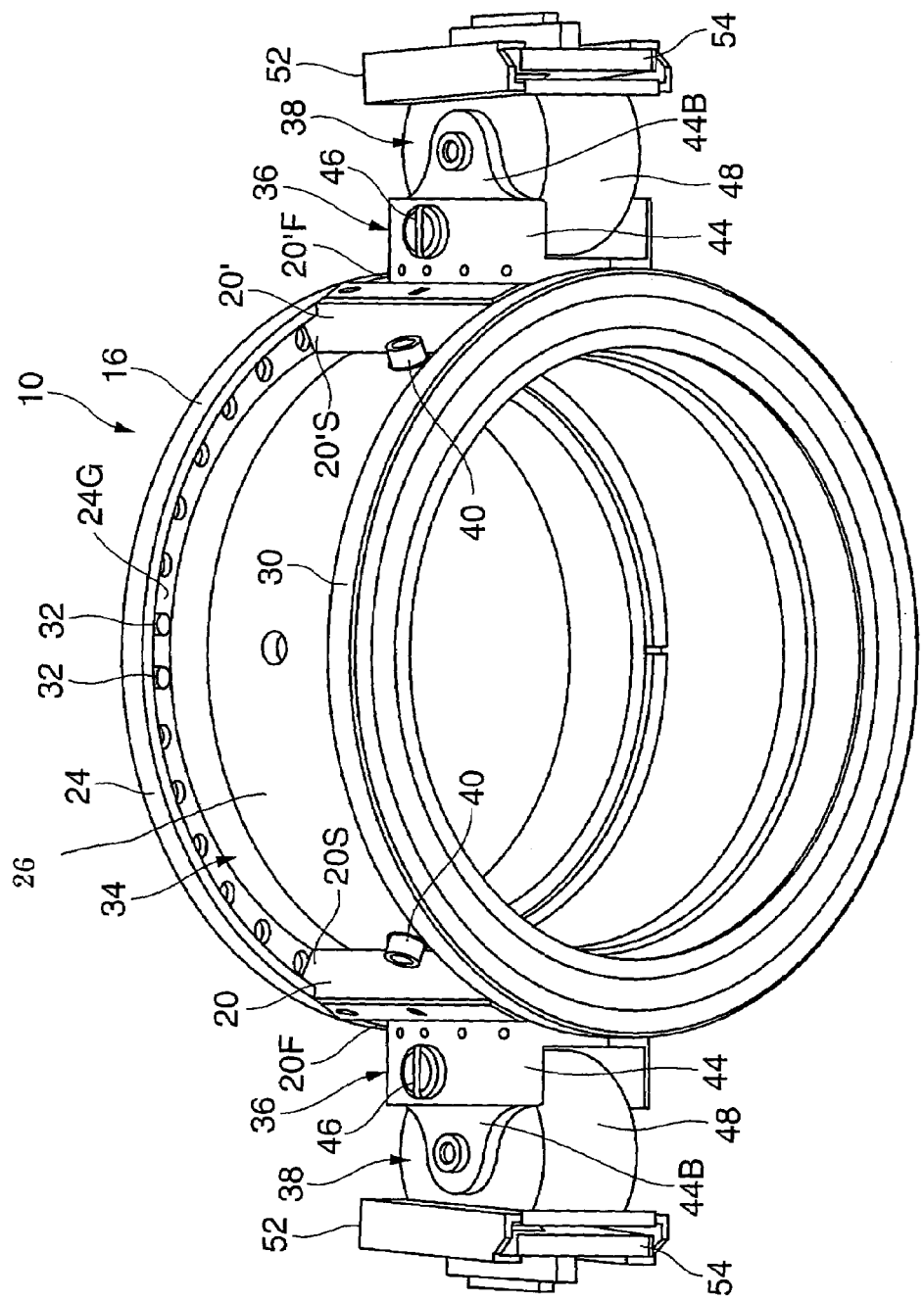
FIG. 2 is a perspective view of the stroboscopic flash device used for the digital camera of FIG. 1.
Figure 3:
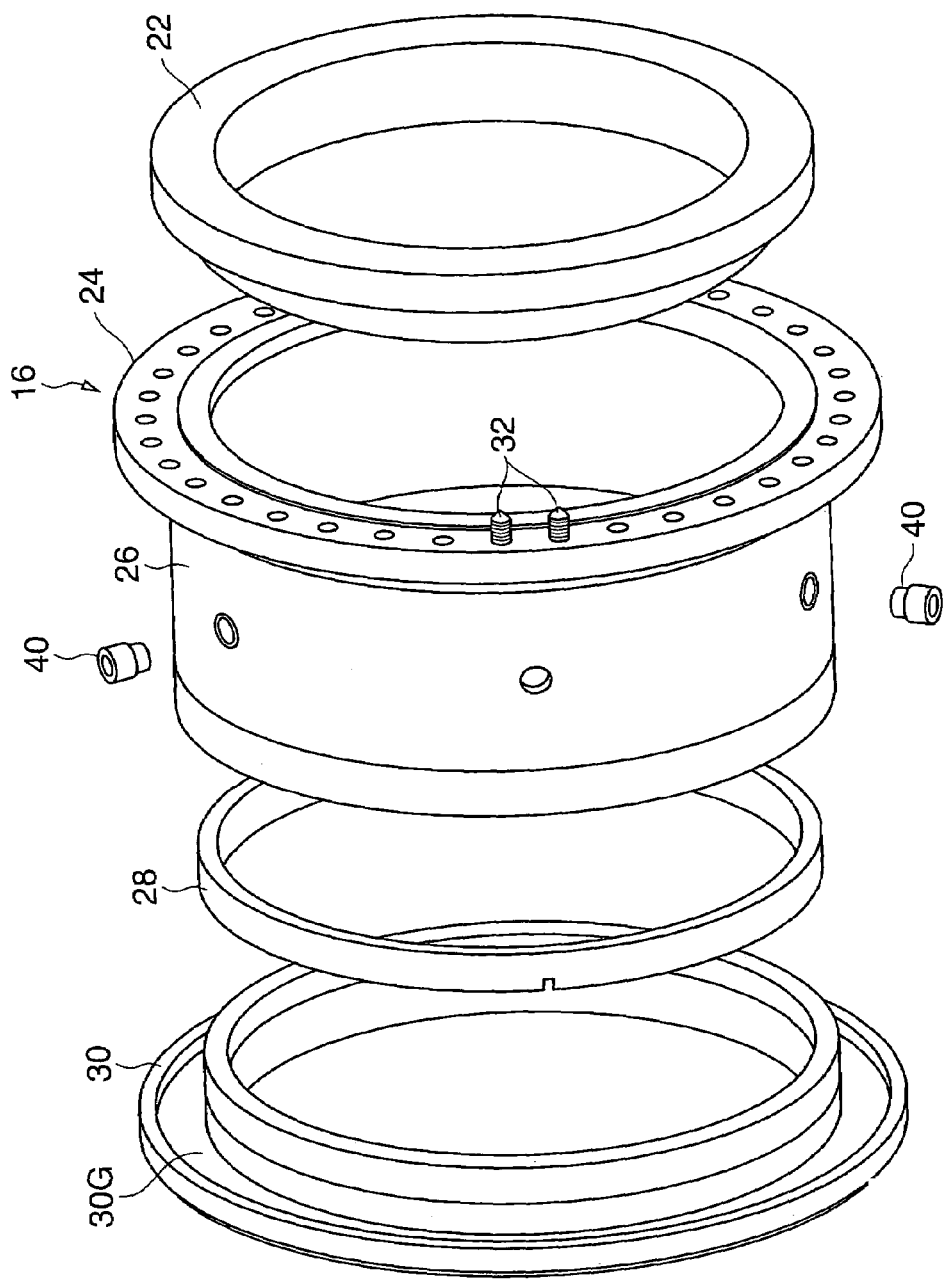
FIG. 3 is an explosively perspective view of a ring-like holder for the stroboscopic flash device of FIGS. 1 and 2.

As shown in FIG. 3, the ring-like holder 16 may comprise an attachment ring 22 attached to the lens barrel 14A in a threaded engagement manner, a flame body 26 having a flange 24 and a attachment flange 30 to be secured to a non-flange side of the flame body 26 through a spacer ring 28. The flange 24 is secured to the attachment ring 22 by screws 32 (also see FIG. 2) extending through the flange 24 and threaded into not shown threaded holes in the attachment ring 22.

The stroboscopic flash device 10 is provided with a circumferential position adjustment mechanism 34 to adjust the position of the stroboscopic flash units 18 and 18' together with the ring-like holder 16 in a circumferential direction of the ring-like holder 16, an upward and downward position adjustment mechanism 36 to adjust the position of the stroboscopic flash units 18 and 18' in an upward or downward direction and a rightward and leftward position mechanism 38 to adjust the position of the stroboscopic flash units 18 and 18' in a rightward or leftward direction.

The circumferential position adjustment mechanism 34 comprises annular grooves 24G and 30G (see FIGS. 2 and 3) formed in the inside faces of the flanges 24 and 30 of the ring-like holders 16 and the stroboscopic flash unit holding bases 20 and 20' on both sides thereof have arc-like slider portions 20S and 20'S to be engaged into the annular grooves 24G and 30G to be slipperily held in the ring-like holder 16. Thus, it will be understood that the stroboscopic flash units 18 and 18' held in the stroboscopic flash unit holding bases 20 and 20' through the upward and downward position adjustment mechanism 36 and the rightward and leftward position mechanism 38 as later described can move along the annular grooves 24G and 30G in the ring-like holder 16 in the circumferential direction. In FIGS. 2 and 3, a reference numeral 40 designates stops to limit the circumferential movement of the stroboscopic flash unit holding bases 20 and 20' beyond the predetermined critical circumferential position.

Figure 4:
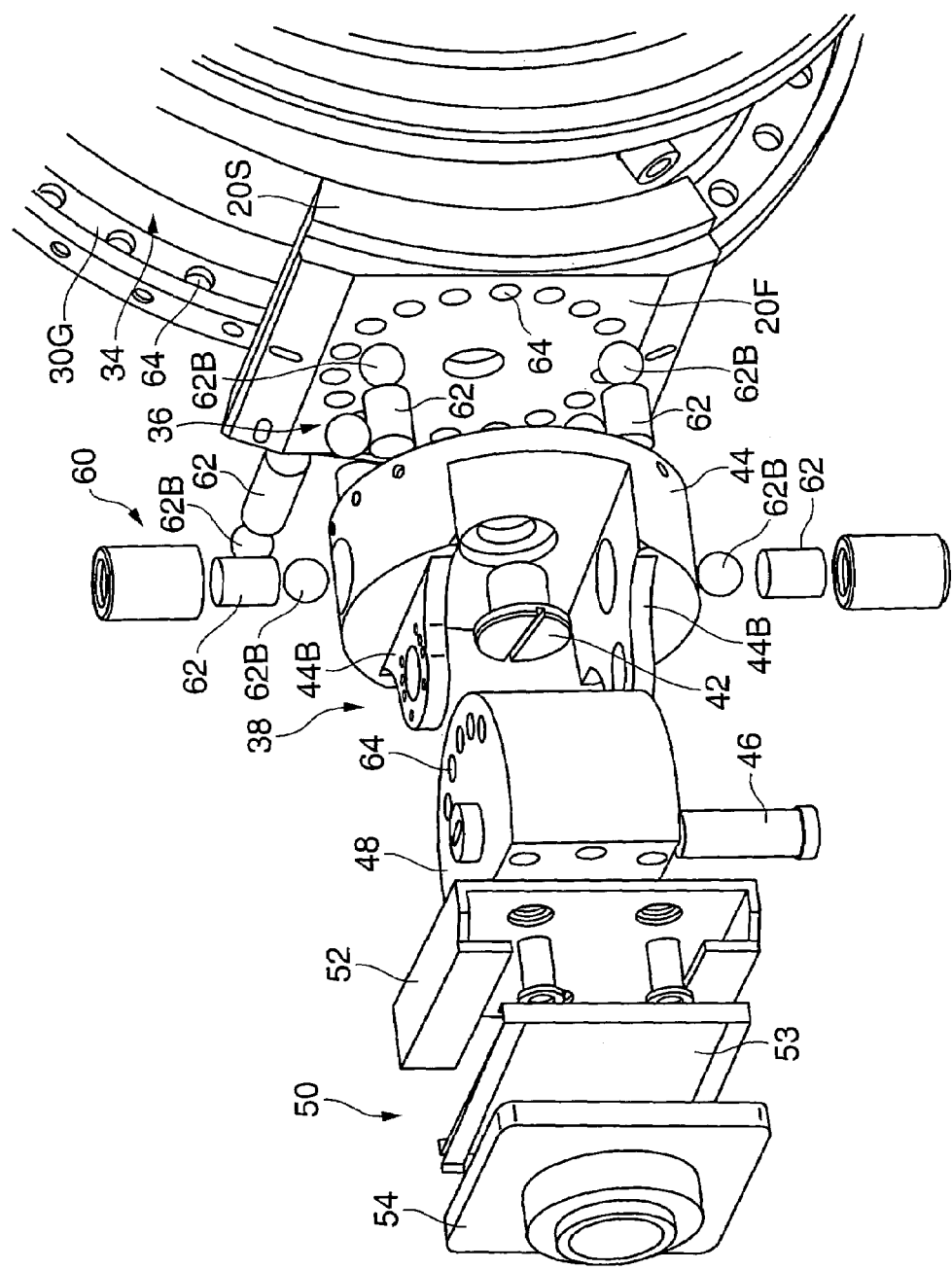
FIG. 4 is an explosively perspective view of the stroboscopic flash unit device of FIGS. 1 and 2 viewed from one of the stroboscopic flash units.
Figure 5:
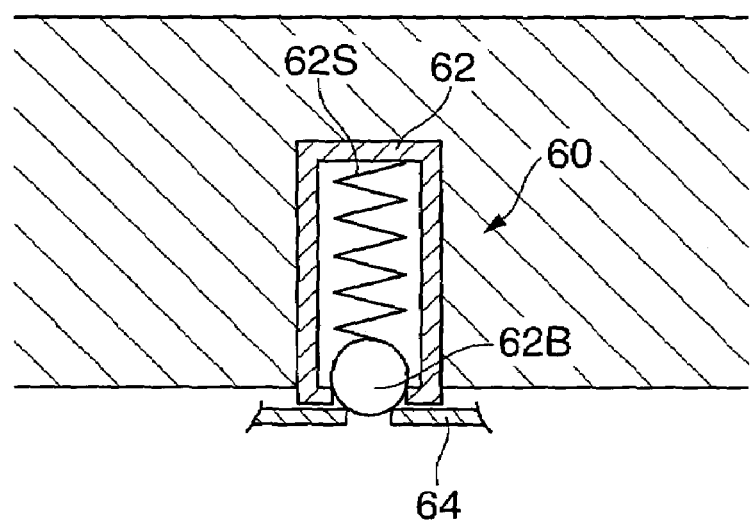
FIG. 5 is an enlarged cross sectional view of click stop means used for the stroboscopic flash device of the invention.

As shown in FIG. 4, the upward and downward position adjustment mechanism 36 comprises an upward and downward position adjustment member 44 in the form of circular flame rotationally held by a rotary shaft 42 at the centers of the stroboscopic flash unit holding bases 20 and 20' so as to swing about an axis perpendicular to the flat surfaces 20F and 20'F (also see FIG. 2) of the stroboscopic flash unit holding bases 20 and 20' and holding the stroboscopic flash units 18 and 18' through the rightward and leftward position mechanism 38 later described. Thus, it will be understood that the flash faces of the stroboscopic flash units 18 and 18' are adjusted in their positions in the upward or downward direction by the rotation of the upward and downward position adjustment member 36.

Also, as shown in FIG. 4, the rightward and leftward position adjustment mechanism 38 comprises a rightward and leftward position adjustment member 48 rotationally held by a rotary shaft 46 between opposing brackets 44B of the upward and downward position adjustment member 44 so as to swing about an axis parallel to the flat surfaces 20F and 20'F of the stroboscopic flash unit holding bases 20 and 20' and holding the stroboscopic flash units 18 and 18' as later described. Thus, it will be understood that the flash faces of the stroboscopic flash units 18 and 18' are adjusted in their positions in the rightward or leftward direction by the rotation of the rightward and leftward position adjustment member 48.

As shown in FIG. 4, there is provided stroboscopic flash unit attachment means 50, which comprises a female type accessory shoe 52 secured by screws to an outer face of the rightward and leftward position adjustment member 48 and a male type accessory shoe 54 resiliently inserted into and held by the female type accessory shoe 54 and the stroboscopic flash units 18 and 18' are attached to the male type accessory shoe 54 by conventional means. In FIG. 4, a reference numeral 53 designates a leaf spring attached to the female type accessory shoe 52 to resiliently hold the male type accessory shoe 54.

In this manner, the stroboscopic flash units 18 and 18' can be set having the optimum posture relative to the photographic part of the object by the circumferential position adjustment mechanism 34, the upward and downward position adjustment mechanism 36 and the rightward and leftward position mechanism 38. Although FIG. 4 shows the position adjustment mechanisms 34, 36 and 38 only on the side of the stroboscopic flash unit holding bases 20, those on the side of the stroboscopic flash unit holding bases 20' are also constructed in the same manner.

The circumferential position adjustment mechanism 34, the upward and downward position adjustment mechanism 36 and the rightward and leftward position mechanism 38 include click stop means 60 to fix the position of the stroboscopic flash units 18 and 18' at the optimum stroboscopic flash setup position relative to the photographic part of the object.

The click stop means 60 may typically comprises a plunger 62 attached to one of two members relatively moved to each other for every position adjustment mechanism and having a ball 62B resiliently protruding therefrom by a spring 62S and engagement holes 64 provided in the other member and with which the ball 62B of the plunger 62 is to be engaged.

More particularly, in the illustrated embodiment, the plunger 62 is embedded in the stroboscopic flash unit holding bases 20 and 20' (one of the members) of the circumferential position adjustment mechanism 34 on one of the sides thereof so that the ball 62B protrudes from one of the side faces thereof while the engagement holes 64 are provided in the flange 24 (the other member) of the ring-like holder 16 in a circumferentially spaced manner. Similarly, the plunger 62 is embedded in the wall of the upward and downward position adjustment member 44 of the upward and downward position adjustment mechanism 36 facing the stroboscopic flash unit holding bases 20 and 20' so that the ball 62B protrudes from the wall of the upward and downward position adjustment member 44 while the engagement holes 64 are provided in the stroboscopic flash unit holding bases 20 and 20' (the other member) on the surface thereof in a circumferentially spaced manner. Also similarly, the plunger 62 is embedded in the upper and lower portions (one of the members) of the upward and downward position adjustment member 44 on the inside face thereof so that the ball 62B protrudes from the inside face thereof while the engagement holes 64 are provided in the upper and lower wall (the other member) of the rightward and leftward position adjustment member 48 of the rightward and leftward position adjustment mechanism 38 in a manner spaced in the direction of arc.

The click stop means 60 of these position adjustment mechanisms 34, 36 and 38 is so set that the ball 62B is engaged in one of the engagement holes 64 corresponding to the optimum position of the stroboscopic flash units 18 and 18' where the flash faces of the stroboscopic flash units 18 and 18' are most appropriately faced to the photographic part of the object in accordance with the size thereof.

The circumferential position adjustment mechanism 34, the upward and downward position adjustment mechanism 36 and the rightward and leftward position mechanism 38 include position indication means 70 to indicate the optimum stroboscopic flash position relative to every photographic part of the object.

Figure 6:
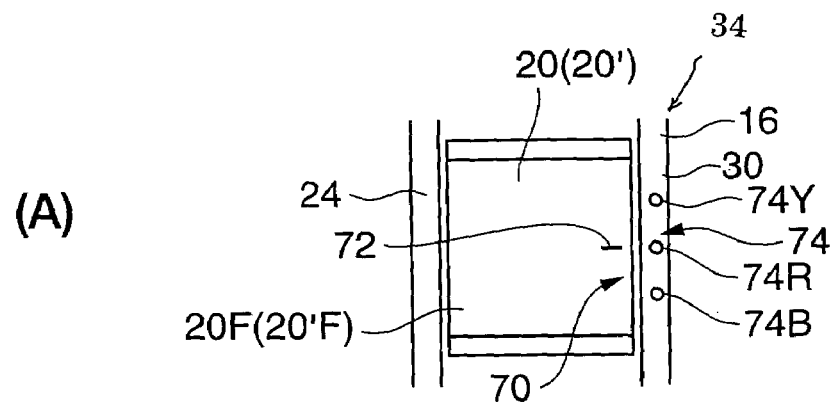
FIG. 6 illustrates position indication means used for the stroboscopic flash device with FIGS. 6A through 6C illustrating the position indication means for the circumferential position adjustment mechanism, the upward and downward position adjustment mechanism and the rightward and leftward position adjustment mechanism, respectively.
Figure 6:
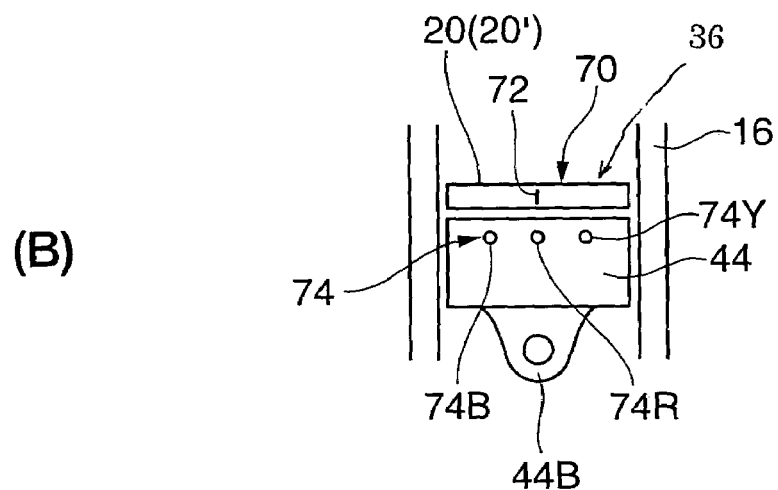
Figure 6:
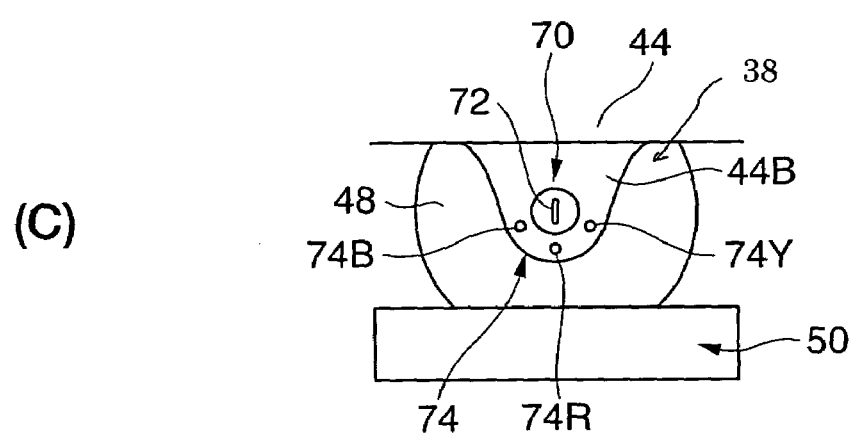

As shown in FIG. 6, this position indication means 70 may comprise a pointer 72 provided on either of the movable and fixed parts of the respective position adjustment mechanisms 34, 36 and 38 and a plurality of indication parts 74 provided at the other part of the respective position adjustment mechanisms 34, 36 and 38 to correspond to the pointer at the optimum position of the stroboscopic flash units 18 and 18' relative to every photographic part of the object.

More particularly, as shown in FIG. 6A, the pointer 72 is formed at the edge of the base surfaces 20F and 20'F (movable part) of the stroboscopic flash unit holding bases 20 and 20' of the circumferential position adjustment mechanism 34 while the indication parts 74 are formed on the flange 30 (fixed part) of the ring-like holder 16 in accordance with the optimum circumferential positions of every photographic parts of the object. Similarly, as shown in FIG. 6B, the pointer 72 is formed at the longitudinal edge of the base surfaces 20F and 20'F (fixed part) of the stroboscopic flash unit holding bases 20 and 20' while the indication parts 74 are formed at the edges of the circumferential face (movable part) of the upward and downward position adjustment member 44 of the upward and downward position adjustment mechanism 36 in accordance with the optimum upward or downward positions of every photographic parts of the object. Also similarly, as shown in FIG. 6C, the pointer 72 is formed at the end face (movable part) of the rotary shaft 46 of the rightward and leftward position adjustment mechanism 38 while the indication parts 74 are formed at the bracket 44B (fixed part) of the upward and downward position adjustment member 44 in accordance with the optimum rightward or leftward positions of every photographic parts of the object.

The indication parts 74 may distinguish the optimum positions relative to every photographic parts of the object by color distinction. For example, in the dentistry clinical treatment, the indication part 74 for the optimum position relative to a patient's face as the photographic part may be of blue color (74B), the indication part 74 for the optimum position relative to the patient's whole mouth as the photographic part may be of red color (74R) and the indication part 74 for the optimum position relative to the patient's mouth parts as the photographic part may be of yellow color (74Y). Thus, it will be understood that the optimum positions relative to various photographic parts of the object can be distinguished by the color indication.

In case where the stroboscopic flash device of the invention may be used for photography of the dentistry clinical treatment, whenever the photographic parts varies from the patient's face through its mouth to its mouth part, the circumferential position of the two stroboscopic flash units 18 and 18' can be adjusted in the upward direction from the position apart by 180 degree on both sides of the ring-like holder 16 to the direction where they get gradually closer to each other every 25 degree. Similarly, whenever the photographic parts varies in the same manner, the upward or downward position of the flash faces of the two stroboscopic flash units 18 and 18' can be adjusted every 25 degree in the upward or downward direction from the horizontal position. Also similarly, whenever the photographic parts varies in the same manner, the rightward or leftward position of the flash faces of the two stroboscopic flash units 18 and 18' can be adjusted every 25 degree in the inside direction from the position where the flash faces are faced in a front direction.

Thus, in case where the photographic part of the object is the patient's ace, for example, as the respective position adjustment mechanism 34, 36 and 38 adjust the position of the stroboscopic flash units 18 and 18' until the pointers 72 of the position indication means 70 of all the position adjustment mechanism 34, 36 and 38 correspond to the "blue" indication parts 74B, the stroboscopic flash units 18 and 18' are set at the posture suitable for taking a photograph of the whole face of the patient. Similarly, in case where the photographic part of the object is the patient's mouth, as the respective position adjustment mechanism 34, 36 and 38 adjust the position of the stroboscopic flash units 18 and 18' until the pointers 72 of the position indication means 70 of all the position adjustment mechanism 34, 36 and 38 correspond to the "red" indication parts 74R, the stroboscopic flash units 18 and 18' are set at the posture suitable for taking a photograph of the whole mouth of the patient. Also similarly, in case where the photographic part of the object is the patient's part of mouth, as the respective position adjustment mechanism 34, 36 and 38 adjust the position of the stroboscopic flash units 18 and 18' until the pointers 72 of the position indication means 70 of all the position adjustment mechanism 34, 36 and 38 correspond to the "yellow" indication parts 74Y, the stroboscopic flash units 18 and 18' are set at the posture suitable for taking a photograph of the part of the mouth of the patient. In this manner, the dentist can accomplish the optimum stroboscopic flash photography in accordance with the photographic part of the object even though the dentist is not an expert of use of the digital camera.

Although, in the illustrated embodiment, the respective position adjustment mechanisms are adapted to set the position of the stroboscopic flash units by the pointer indicating the color-distinction indication parts 74R, 74B and 74Y, the position adjustment mechanism may set the stroboscopic flash units so as to properly select their posture without any position indication means. Otherwise, even though there are provided the position indication means, in case where a photographic object other than the object for which the position indication means is previously determined or the photographic part or parts of the object other than those for which the position indication means is previously determined should be taken a photograph of, the respective position adjustment mechanism can adjust the position of the stroboscopic flash units without using the position indication means.

Although, in the aforementioned description, there is explained the case where the digital camera 12 is used for the picture photography of dentistry clinical treatment, it should be understood that the stroboscopic flash device 10 of the invention may be applied to the digital camera used for application other than the dentistry clinical treatment.

According to the invention, since the plurality of the stroboscopic flash units can be set at the optimum position in the circumferential, upward or downward and rightward or leftward directions relative to every photographic part or parts of the object, the standardized optimum stroboscopic flash posture can be easily obtained for every photographic part of the object, which improves the availability on industries.

Although one preferred embodiment of the invention has been described and illustrated with reference to the accompanying drawings, it will be understood by those skilled in the art that it is by way of example, and that various changes and modifications may be made without departing from the spirit and scope of the invention, which is d only to the appended claims.

What is claimed is:

1. A stroboscopic flash device for a digital camera including a ring-like holder removably attached to a lens barrel of a camera body of said digital camera and a plurality of stroboscopic flash unit holding bases to hold a plurality of stroboscopic flash units, respectively and comprising a circumferential position adjustment mechanism to adjust a circumferential position of said stroboscopic flash unit holding bases in a circumferential direction of said ring-like holder along said ring-like holder, characterized by further comprising an upward and downward position adjustment mechanism to adjust an upward and downward position of the flash face of said stroboscopic flash units by swinging said stroboscopic flash units about an axis perpendicular to a base surface of said stroboscopic flash unit holding bases and a rightward and leftward position mechanism to adjust a rightward and leftward position of the flash face of said stroboscopic flash units by swinging said stroboscopic flash units about an axis parallel to the base surface of said stroboscopic flash unit holding bases.

2. A stroboscopic flash device for a digital camera as set forth in claim 1, and wherein said circumferential position adjustment mechanism, said upward and downward position adjustment mechanism and said rightward and leftward position adjustment mechanism include position indication means to indicate the optimum stroboscopic setup position of said respective mechanism relative to every photographic part of an object to be taken a photograph of.

3. A stroboscopic flash device for a digital camera as set forth in claim 1, and wherein said circumferential position adjustment mechanism, said upward and downward position adjustment mechanism and said rightward and leftward position adjustment mechanism include click stop means to resiliently fix the optimum stroboscopic setup position relative to a photographic part of an object to be taken a photograph of.

4. A stroboscopic flash device for a digital camera as set forth in claim 3, and wherein said click stop means of said circumferential position adjustment mechanism, said upward and downward position adjustment mechanism and said rightward and leftward position adjustment mechanism comprises a plunger attached to one of two members relatively moved to each other and having a ball resiliently protruding therefrom and engagement holes provided in the other member and with which said ball of said plunger is to be engaged.

5. A stroboscopic flash device for a digital camera as set forth in claim 2, and wherein said position indication means comprises a pointer provided on a movable part of said respective mechanism and indication parts provided at a fixed part of said respective mechanism to correspond to said pointer at the optimum position of said stroboscopic flash units relative to every photographic part of said object.

6. A stroboscopic flash device for a digital camera as set forth in claim 2, and wherein said circumferential position adjustment mechanism, said upward and downward position adjustment mechanism and said rightward and leftward position adjustment mechanism include click stop means to resiliently fix the optimum stroboscopic setup position relative to a photographic part of an object to be taken a photograph of.

7. A stroboscopic flash device for a digital camera as set forth in claim 6, and wherein said click stop means of said circumferential position adjustment mechanism, said upward and downward position adjustment mechanism and said rightward and leftward position adjustment mechanism comprises a plunger attached to one of two members relatively moved to each other and having a ball resiliently protruding therefrom and engagement holes provided in the other member and with which said ball of said plunger is to be engaged.

* * * * *